No. 843,835. PATENTED FEB. 12, 1907.
F. G. McGINNIS.
TRUCK SKID.
APPLICATION FILED JULY 31, 1906.
2 SHEETS—SHEET 1.
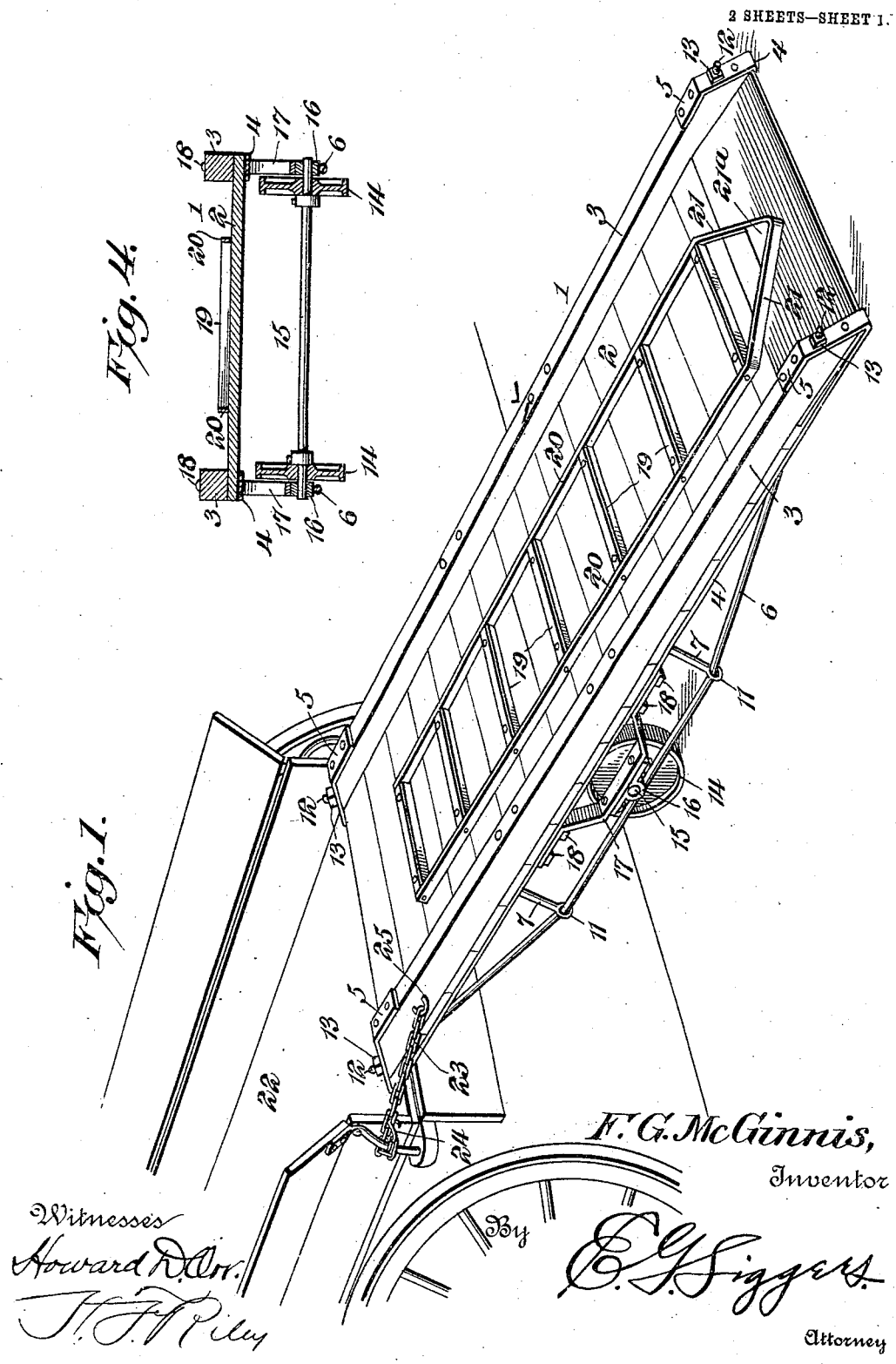
F. G. McGinnis,
Inventor
Witnesses
Attorney No. 843,835. PATENTED FEB. 12, 1907.
F. G. McGINNIS.
TRUCK SKID.
APPLICATION FILED JULY 31, 1906.
2 SHEETS—SHEET 2.
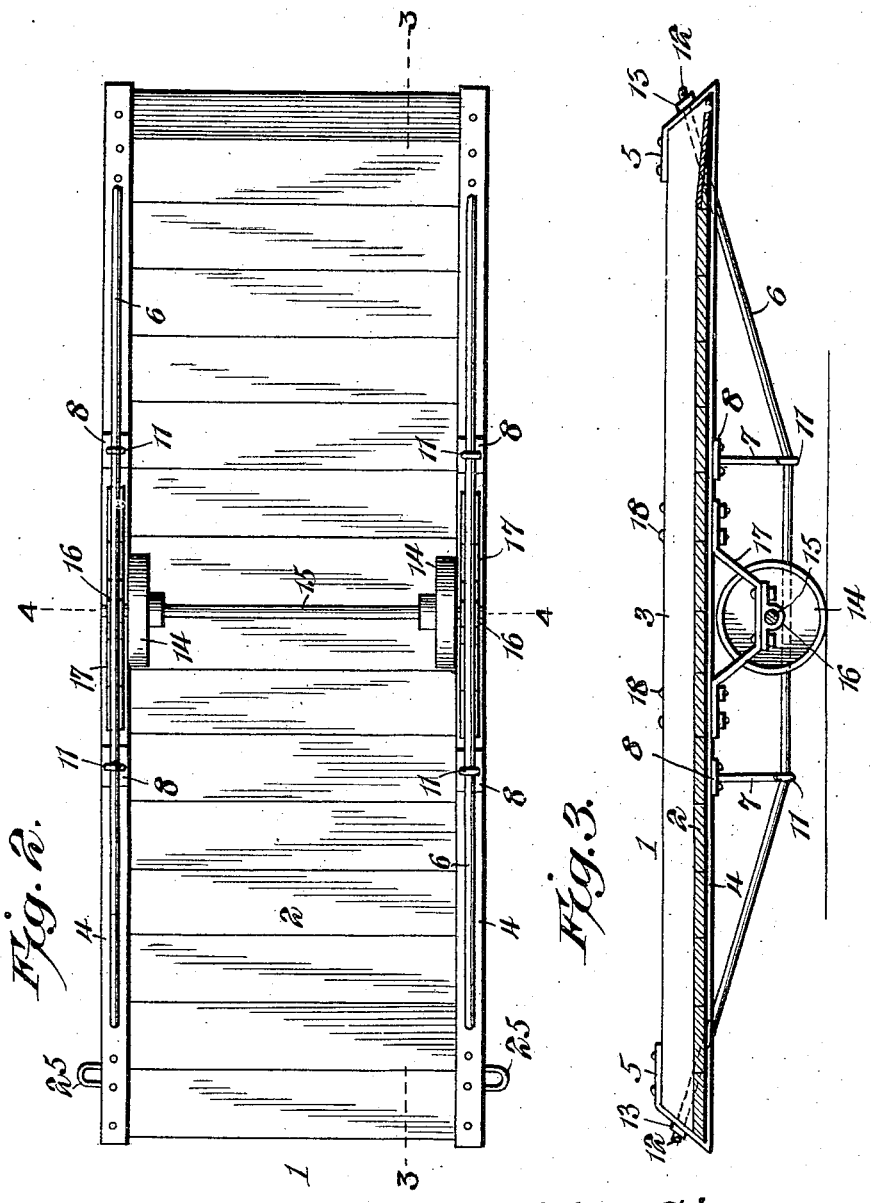

UNITED STATES PATENT OFFICE.

FRANK GOODE McGINNIS, OF LYNCHBURG, VIRGINIA.

TRUCK-SKID.

No. 843,835.      Specification of Letters Patent.      Patented Feb. 12, 1907.

Application filed July 31, 1906. Serial No. 328,597.

*To all whom it may concern:*

Be it known that I, FRANK GOODE Mc-GINNIS, a citizen of the United States, residing at Lynchburg, in the county of Campbell and State of Virginia, have invented a new and useful Truck-Skid, of which the following is a specification.

The invention relates to improvements in skids.

The object of the present invention is to improve the construction of skids and to provide a simple, inexpensive, and efficient one of great strength and durability, adapted to be securely fastened to a dray or other vehicle and capable of enabling a truck to be run directly upon the same, to obviate the necessity of removing the load from the truck and then lifting it or skidding it by hand into the vehicle.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a skid constructed in accordance with this invention. Fig. 2 is a reverse plan view of the same. Fig. 3 is a longitudinal sectional view on the line 3 3 of Fig. 2. Fig. 4 is a transverse sectional view on the line 4 4 of Fig. 3.

Like numerals of reference designate corresponding parts in all the figures of the drawings.

1 designates a skid provided with a floor or platform 2 and having longitudinal side bars 3 arranged upon the upper face of the floor or platform and forming outer guides or guards for preventing the wheels of a truck from accidentally leaving the skid. The skid is reinforced at the sides by means of longitudinal straps or bars 4, which are arranged on the lower face of the floor or platform at points beneath the longitudinal side bars 3 and which have their terminals 5 bent upwardly and inwardly on the ends of the side bars 3 and bolted or otherwise secured to the same.

The floor or platform is preferably constructed of transverse boards or pieces arranged as shown in Figs. 1 and 2 of the drawings, and the framework or body of the skid is further strengthened and stiffened by means of the side trusses, consisting of truss-rods 6 and struts 7, which depend from the floor or platform of the skid, as clearly shown in Figs. 1 and 3 of the drawings. The struts, which depend from the platform, are provided at their upper ends with plates 8, which fit against the straps or bars 4 and which are pierced by suitable fastening devices for securing the struts to the platform. The struts, which are arranged in pairs, are located at opposite sides of the center of the side bars 3 and are provided at their lower ends with eyes 11 for the reception of the truss-rods 6, which have inclined end portions extending upwardly from the lower ends of the struts and piercing the ends of the platform or floor, and the terminals of the side bars 3 and terminating at the end edges thereof. The ends 12 of the truss-rods are threaded and are provided with nuts 13, which engage the end portions of the straps or bars 4. By this construction the body of the skid is stiffened and strengthened and is enabled to stand the weight of heavily-loaded trucks, which may be run rapidly up the skid without liability of breaking or otherwise injuring the same.

The skid is supported at its center by wheels 14, which are mounted on a transverse axle 15, and the latter is arranged in suitable bearings 16 of brackets 17. The brackets 17 are secured to the lower face of the floor or platform of the skid and are located between the same and the central portion of the truss-rods. These brackets have horizontal bottom portions and inclined side portions, as clearly shown in Fig. 3 of the drawings, the bearings 16 being secured to the horizontal bottom portions. The horizontal portions of the brackets are arranged above the plane of the intermediate portions of the truss-rods, and the axle is also located above the latter. The terminals of the brackets are fitted against the straps or bars 4 and are secured to the skid by means of bolts 18, arranged in pairs and piercing the floor or platform and the side bars 3.

The skid is provided at its upper face with transverse cleats 19, arranged at intervals and terminating short of the side bars to provide spaces for the wheels of a truck, and the inner longitudinal guide-bars 20 are secured to the ends of the cleats to form guards. The inner guide-bars, which are spaced from the outer side bars 3, have lower converging guiding portions 21 and may be constructed of a single piece of metal, as clearly shown in Fig. 1 of the drawings. The converging guiding portions are secured at their apex to a triangular block or piece $21^a$, which is fastened to the floor or platform of the skid.

The upper end of the skid is secured to the rear end of a dray or wagon 22 by means of short chains 23, having terminal hooks 24. The attached ends of the chains are linked into eyes 25, consisting of staples, the sides or legs of which pierce the side bars 3 at the upper terminal thereof. The terminals of the sides or legs of the staples are threaded for the reception of nuts.

The skid is adapted to be readily transferred from one point to another, and it will enable trucks to be wheeled directly upon a dray or other vehicle, and inner and outer guides are provided for preventing the wheels of a truck from leaving the skid. The cleats, to which the inner guides are secured, are adapted to prevent the feet of the person handling a truck from slipping, so that the trucks may be run up and down the skid with great rapidity.

Having thus fully described my invention, what I claim as new, and desire to secure by Letters Patent, is—

1. A skid comprising a platform, truss-rods located beneath the platform and connected at their ends to the same, struts depending from the platform and receiving the truss-rods, brackets secured to the platform and arranged beneath the same, an axle connected at its ends with the brackets, and wheels mounted on the axle.

2. A skid comprising a platform provided at its upper face with longitudinal side bars forming outer guards or guides, cleats mounted on the platform and terminating short of the side bars, and inner guards or guides arranged at the ends of the cleats.

3. A skid comprising a platform provided at its upper face with longitudinal side bars forming outer guards or guides, cleats mounted on the platform and terminating short of the side bars, and inner guards or guides arranged at the ends of the cleats and having converging lower portions.

4. A skid comprising a platform, truss-rods located beneath and connected at their ends to the platform, struts depending from the platform and arranged in pairs and connected with the truss-rods, brackets secured to the lower face of the platform and located between the same and the intermediate portions of the truss-rods, an axle connected at its ends to the brackets and located above the truss-rods, and wheels mounted on the axle.

5. A skid comprising a platform provided at its upper face with longitudinal side bars forming outer guards or guides, and cleats mounted on the platform and projecting above the same and terminating short of the side bars.

In testimony that I claim the foregoing as my own I have hereto affixed my signature in the presence of two witnesses.

FRANK GOODE McGINNIS.

Witnesses:
D. L. TAYLOR,
J. J. O'BRIEN.